US006522699B1

United States Patent
Anderson et al.

(10) Patent No.: US 6,522,699 B1
(45) Date of Patent: Feb. 18, 2003

(54) TRANSMISSION SYSTEM FOR REDUCTION OF AMATEUR RADIO INTERFERENCE

(75) Inventors: Carl William Anderson, Kanata (CA); Guy M. A. F. Duxbury, Nepean (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/100,010

(22) Filed: Jun. 19, 1998

(51) Int. Cl.[7] .......................... H04L 27/04; H04L 27/36; H04L 25/03
(52) U.S. Cl. .................. 375/295; 375/296; 375/298
(58) Field of Search ................ 375/295, 296, 375/285, 261, 290, 291, 298, 222; 379/410

(56) References Cited

U.S. PATENT DOCUMENTS

| | | | | |
|---|---|---|---|---|
| 3,890,461 A | * | 6/1975 | Vogelman et al. | 340/5.6 |
| 5,185,762 A | * | 2/1993 | Schilling | 370/342 |
| 5,249,200 A | * | 9/1993 | Chen et al. | 375/296 |
| 5,617,063 A | * | 4/1997 | Chaplik | 375/296 |
| 5,701,332 A | * | 12/1997 | Decrouez | 375/334 |
| 5,812,928 A | * | 9/1998 | Watson, Jr. et al. | 455/5.1 |
| 6,140,956 A | * | 10/2000 | Hillman et al. | 342/357.07 |
| 6,344,871 B1 | * | 2/2002 | Liu et al. | 348/21 |

* cited by examiner

Primary Examiner—Tesfaldet Bocure

(57) ABSTRACT

The invention is a novel method and transmission system for mitigating the adverse effects of amateur (HAM) radio interference on digital signals transmitted across a twisted pair and reducing the interference caused by the digital signals to amateur radio communications. At the heart of the invention is strategical placement of the frequency spectrum of the transmitted signal relative to the center frequency of the HAM bands. In particular, the signal spectrum is permitted to straddle one or more HAM bands, which permits the transport of high data rates with a single carrier. At the transmitter, the signal is filtered with a real-valued symmetric baseband filter in order to remove signal content in the HAM bands. At the receiver, the signal undergoes adaptive interference cancellation, followed by processing through a decision feedback equalizer. In some cases, the signal is filtered at baseband with a real-valued filter to remove interference in the HAM bands. In the context of a telecommunications access system, the inventive technique can be applied to either or both directions of traffic flow, i.e., downstream and upstream, and multiple carriers can be added to increase capacity in any given direction.

18 Claims, 10 Drawing Sheets

TRANSMISSION SYSTEM FOR REDUCTION OF AMATEUR RADIO INTERFERENCE

FIELD OF THE INVENTION

This invention relates to the transmission and reception of digital signals along subscriber telephone loops and is partially concerned with mitigating the adverse effects of the digital signals interfering with amateur radio transmissions and vice versa.

BACKGROUND OF THE INVENTION

In an access system for use in a fiber-to-the-neighbourhood (FTTN) network, digital data is exchanged between a host digital terminal (HDT) and a plurality of optical network units (ONUs) via optical fibers. Each ONU is responsible for exchanging downstream (ONU-to-subscriber) and upstream (subscriber-to-ONU) data with a respective plurality of subscribers via copper twisted pairs. Typically, the downstream and upstream data are modulated about separate carrier frequencies and occupy spectral bands which have a width proportional to the transmitted data rate. For example, a data stream at 20 Megabits per second, modulated using 16-QAM (quadrature amplitude modulation with 16 constellation points, i.e., 4 bits per symbol), can be transported by a spectral band having a width of 5 MHz and being centered about a given carrier frequency.

Two major factors affecting the performance of a system which transmits data along a twisted pair are loop attenuation and crosstalk. In order to combat these two elements, it is commonplace to use a lower-order modulation format, such as 16-QAM, and to restrict the frequency range of the upstream and downstream data to approximately between 1 MHz and 20 MHz.

Unfortunately, this frequency range is also subject to interference from amateur radio communications carried by HAM bands commonly known as the 160-, 80-, 40-, 30-, 20-, 17- and 15-meter bands, whose spectral characteristics are illustrated in the following table:

| HAM band (meters) | Frequency range (MHz) | Center frequency (MHz) |
|---|---|---|
| 160 | 1.800–2.000 | 1.900 |
| 80 | 3.500–4.000 | 3.750 |
| 40 | 7.000–7.300 | 7.150 |
| 30 | 10.100–10.150 | 10.125 |
| 20 | 14.000–14.350 | 14.175 |
| 17 | 18.068–18.168 | 18.118 |
| 15 | 21.000–21.450 | 21.225 |

Clearly, a downstream or upstream spectrum of any considerable width (i.e., data rate) will straddle at least one HAM band. By way of example, FIG. 1 shows a signal spectrum 11 having a center frequency $f_C$ of approximately 9.0 Mz and a bandwidth $f_S$ of approximately 5 MHz. The signal spectrum 11 is seen to span two HAM bands, specifically bands 14 and 13 (centered at 7.150 MHz and 10.125 MHz, respectively).

Due to various regulations governing electromagnetic interference, it is imperative that a signal transmitted along the twisted pair contain reduced signal energy in any HAM band so as not to interfere with HAM radio communications occurring in those bands. This requirement is somewhat in conflict with the goal of transmitting high data rates, and has forced telecommunications companies to provide ways of reducing or eliminating the signal energy in these bands, while still delivering the high data rates demanded by today's customers, In one prior art approach, the total downstream (or upstream) data rate is handled by transporting the data using multiple separate carriers, which allows placement of the individual spectra between HAM bands, thereby avoiding any intersections of the signal spectra with HAM bands. However, this technique increases the complexity of the transmitter and receiver, as both must now be equipped to deal with multiple parallel modulations or demodulations.

Another prior art approach acknowledges that the transmitted signal spectrum will straddle one or more HAM bands, and the signal to be transmitted is passed through a aeries of digital notch filters in the transmitter, each filter notch being centered about a HAM band. These filters may operate at passband or at baseband. If a passband filter (or series of filters) is used, then the sharpness required of the filter (or filters) is very high, necessitating the use of a large number of taps. On the other hand, if baseband filters are employed, the notches arc generally asymmetrically disposed about zero frequency, requiring the use of complex coefficients. Either solution leads to a relatively high complexity for the transmitter.

Even if notching at the transmitter were able to prevent the signal spectrum from interfering with the HAM bands, it cannot control the onset of interference due to transmissions occurring in the HAM bands themselves. That is to say, the receiver will necessarily accept a signal whose spectrum has undergone radio-frequency interference due to HAM transmissions. In order to combat this effect, a conventional approach applies band-pass and notch filtering at the receiver in order to pass only those components of the signal spectrum lying outside the HAM bands. Again, regardless of whether filtering is performed at passband or at baseband, the complexity of the required filtered is relatively high.

Finally, the art has seen the development of a technique known as DMT (discrete multi-tone), which relies on the transmission of a large number of carriers generated by inverse Fourier transform techniques, each carrier being associated with a small amount of the overall required bandwidth. Radio-frequency interference is sidestepped in the DMT system simply by employing only those carriers which do not overlap with the HAM bands. However, the processing requirements of an actual implementation of DMT are often too demanding to permit cost-effective use of this technique.

SUMMARY OF THE INVENTION

It is an object of the present invention to mitigate or obviate one or more disadvantages of the prior art.

Therefore, the invention may be summarized according to a first broad aspect as a transmitter for transmitting a modulated signal across a transmission medium, the transmitter comprising: an encoder for encoding a digital data stream into one or more encoded digital signals; one or more substantially identical baseband notching filters connected to the encoder, for respectively receiving the one or more encoded digital signals, each baseband notching filter having a notch at zero frequency; and a modulator connected to the one or more baseband notching filters, for producing the modulated signal centered about a carrier frequency, wherein the carrier frequency is approximately equal to the center frequency of an interference band.

According to a second broad aspect, the present invention may be summarized as a receiver for extracting a digital data stream from a modulated signal, said modulated signal being centered about a carrier frequency, the receiver comprising: adaptive interference cancellation (AIC) means for controllably reducing narrowband interference present in the modulated signal around the carrier frequency, thereby to produce an interference-reduced signal; a demodulator connected to the AIC means for receiving and demodulating the interference-reduced signal, thereby to produce one or more baseband demodulated signals; a power estimator connected to the demodulator and to the AIC means, for receiving the one or more baseband demodulated signals, calculating the power of residual interference present in the one or more baseband demodulated signals around the carrier frequency and providing the AIC means with an interference estimate signal; one or more substantially identical baseband notching filters connected to the demodulator, for receiving the one or more baseband demodulated signals and producing respective filtered demodulated signals, each baseband notching filter having a notch at zero frequency; and a decision-feedback equalizer (DFE) connected to the one or more baseband notching filters, for receiving the filtered demodulated signals, decoding digital data embedded therein and producing the digital data stream.

The invention can be summarized according to another broad aspect as a method of transmitting digital data, comprising the steps of: encoding the data into one or more baseband digital signals; filtering the one or more baseband digital signals with respective baseband filters having notches at zero frequency; modulating the filtered baseband digital signals about a carrier frequency, thereby to produce a modulated signal; and transmitting the modulated signal across a transmission medium; wherein the carrier frequency is approximately equal to the center frequency of an interference band.

According to yet another broad aspect, the present invention may be summarized as a method of recovering a digital data stream from a received signal modulated about a carrier frequency, comprising: demodulating the modulated signal, thereby to produce one or more baseband demodulated signals; filtering the one or more baseband demodulated signals with respective baseband filters having notches at zero frequency; and decoding the filtered baseband demodulated signals, thereby to recover the digital data; wherein the carrier frequency is approximately equal to the center frequency of an interference band.

According to still another broad aspect, the present invention may be summarized as a modem for transmitting a first modulated signal onto a twisted pair and for receiving a second modulated signal from the twisted pair, comprising: a hybrid for interfacing with the twisted pair; a transmitter connected to the hybrid, for producing the first modulated signal from a first digital data stream, the transmitter comprising an encoder for encoding the first digital data stream into one or more encoded digital signals; one or more substantially identical baseband notching filters connected to the encoder, for respectively receiving the one or more encoded digital signals, each baseband notching filter having a notch at zero frequency; and a modulator connected to the one or more baseband notching filters, for producing the first modulated signal centered about a carrier frequency, wherein the carrier frequency is approximately equal to the center frequency of an interference band; and a receiver connected to the hybrid, for extracting a digital data stream from the second modulated signal, the receiver comprising adaptive interference cancellation (AIC) means for controllably reducing narrowband interference present in the second modulated signal around the carrier frequency, thereby to produce an interference-reduced signal; a demodulator connected to the AIC means for receiving and demodulating the interference-reduced signal, thereby to produce one or more baseband demodulated signals; a power estimator connected to the demodulator and to the AIC means, for receiving the one or more baseband demodulated signals and providing the AIC means with an estimate of residual interference in the one or more baseband demodulated signals around the carrier frequency; one or more substantially identical baseband notching filters connected to tile demodulator, for receiving the one or more baseband demodulated signals and producing respective filtered demodulated signals, each baseband notching filter having a notch at zero frequency; and a decision-feedback equalizer (DFE) connected to the one or more baseband notching filters, for receiving the filtered demodulated signals, decoding digital data embedded therein and producing the second digital data stream.

The present invention may be summarized according to still another broad aspect as a method of allocating a frequency spectrum, comprising; selecting a first portion of the frequency spectrum for transmission of a first signal, said first portion having a first center frequency $f_{C1}$; wherein $f_{C1}$ is related to the center frequency $f_{H1}$ of an interference band by $f_{C1}$ being approximately equal to $f_{H1}$.

According to a further broad aspect, the present invention may be summarized as a method of allocating a frequency spectrum, comprising: selecting a first portion of the frequency spectrum for transmission of a first signal, said first portion having a center frequency $f_{C1}$ and a bandwidth $f_{S1}$; wherein $f_{S1}$ and $f_{C1}$ are related to the center frequencies $f_{H1}$ and $f_{H2}$ of two interference bands by $f_{C1}$ being approximately equal to $\frac{1}{2}(f_{H1}+f_{H2})$ and $f_{S1}$ being approximately equal to $2|f_{H2}-f_{H1}|$.

BRIEF DESCRIPTION OF THE DRAWINGS

The preferred embodiment of the present invention will now be described with reference to the accompanying drawings, in which.

DETAILED DESCRIPTION OF THE PREFERRED EMBODIMENT

Figure 2:
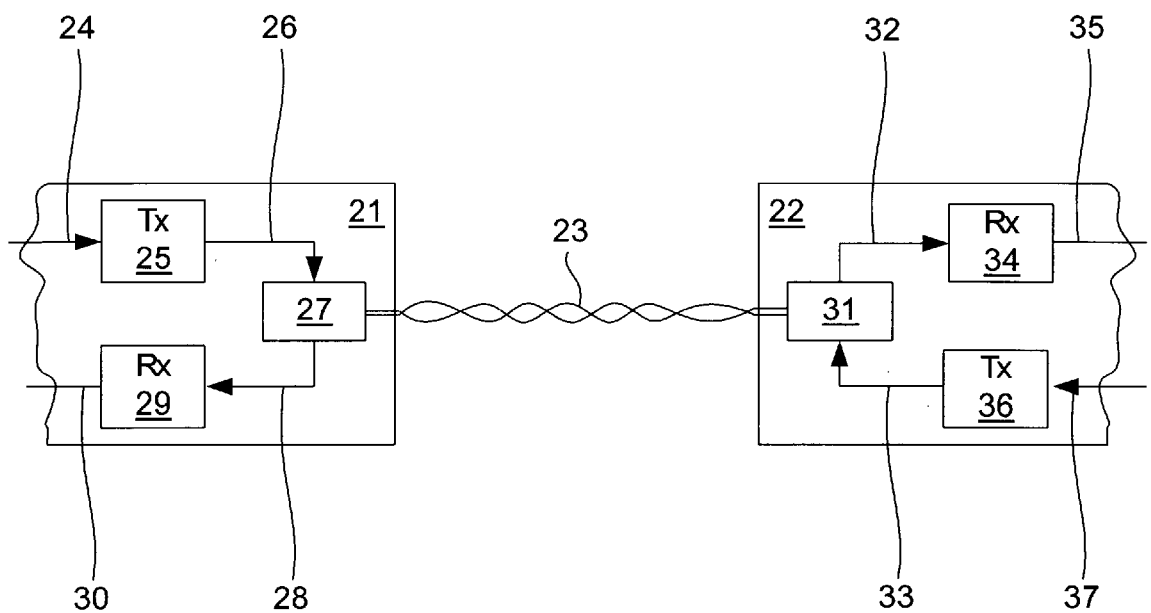
FIG. 2 is a block diagram of a telco modem connected to a customer premises modem in accordance with the prior art and with the present invention.

The present invention can best be understood with the aid of FIG. 2, showing a block diagram of part of a telecommunications access system, in which a telco modem 21 exchanges downstream and upstream data with a customer premises modem 22 across a copper twisted pair 23. The telco modem 21 may be located within a line card at an optical network unit, which may exchange data with a host digital terminal (not shown). The generic structure illustrated in FIG. 2 is used both in the prior art and in the present invention.

At the telco modem 21, a downstream digital data stream 24 destined for the customer is modulated in accordance with a modulation format (e.g., 16-QAM) by a transmitter 25, producing a transmitted modulated downstream signal 26 that is subsequently output onto the twisted pair 23 by a hybrid 27. The hybrid 27 also serves to separate a received modulated upstream signal 28 arriving on the twisted pair 23, outputting it to a receiver 29 which demodulates the received modulated upstream signal 28 and decodes an upstream digital data stream 30 embedded therein.

Similarly, the customer premises modem 22 also comprises a hybrid 31, used for extracting a received modulated downstream signal 32 arriving on the twisted pair 23 and equally for sending a transmitted modulated upstream signal 33 towards the telco modem 21. The received modulated downstream signal 32 travels to a receiver 34, where it is demodulated and from which an embedded downstream digital data stream 35 is recovered. The transmitted modulated upstream signal 33 is produced by a transmitter 36 which modulates a customer-generated upstream digital data stream 37 according to a suitable modulation format, such as 16-QAM.

Although the preferred modulation format is indeed QAM having 16 constellation points, it is equally suitable to utilize other modulation schemes, such as carrierless amplitude and phase (CAP) modulation and binary (BPSK) and quadrature phase-shift keying (QPSK). Furthermore, the use of different orders of modulation is equally suitable, simply resulting in a different ratio of the number of bits carried per symbol.

As already discussed, depending on the data rate requirements in either direction of traffic flow, the transmitted modulated downstream signal 26 and the transmitted modulated upstream signal 33 may each straddle one or more amateur radio bands. For example, if the required downstream data rate is approximately 20 Mbps, and if the transmitter 25 employs 16-QAM, then the resulting downstream spectrum will have a 3 dB width of 5 MHz. This spectral width necessarily straddles 2 HAM bands, which leads to the aforementioned tradeoff between interference reduction and modem complexity. However, if the carrier frequency and data rate of the transmitted modulated downstream signal 26 are chosen in accordance with the present invention, performance can be improved while minimizing modem complexity.

Figure 1:
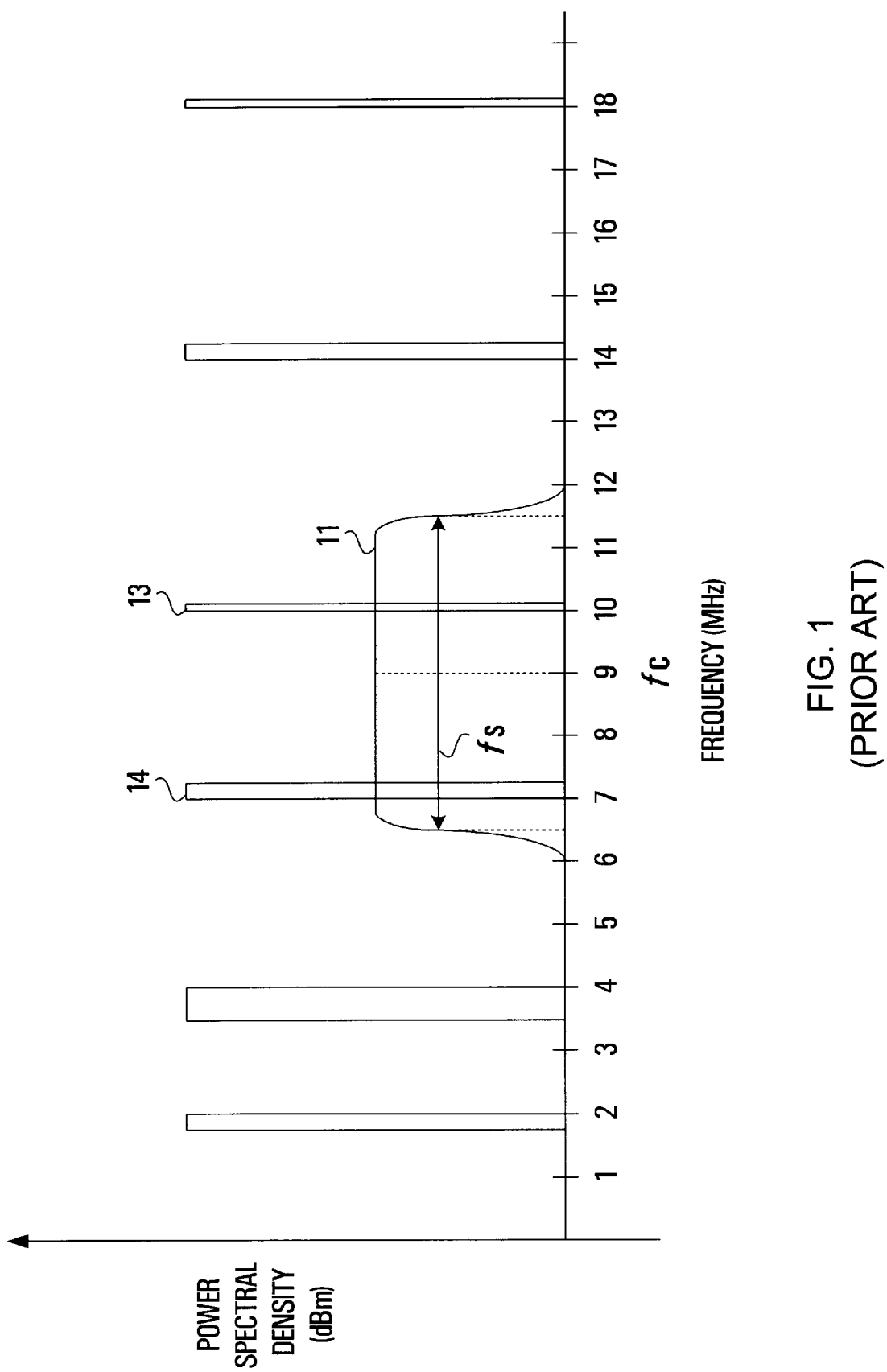
FIG. 1 shows the placement of downstream and upstream signal spectra relative to HAM bands in accordance with the prior art.
Figure 3:
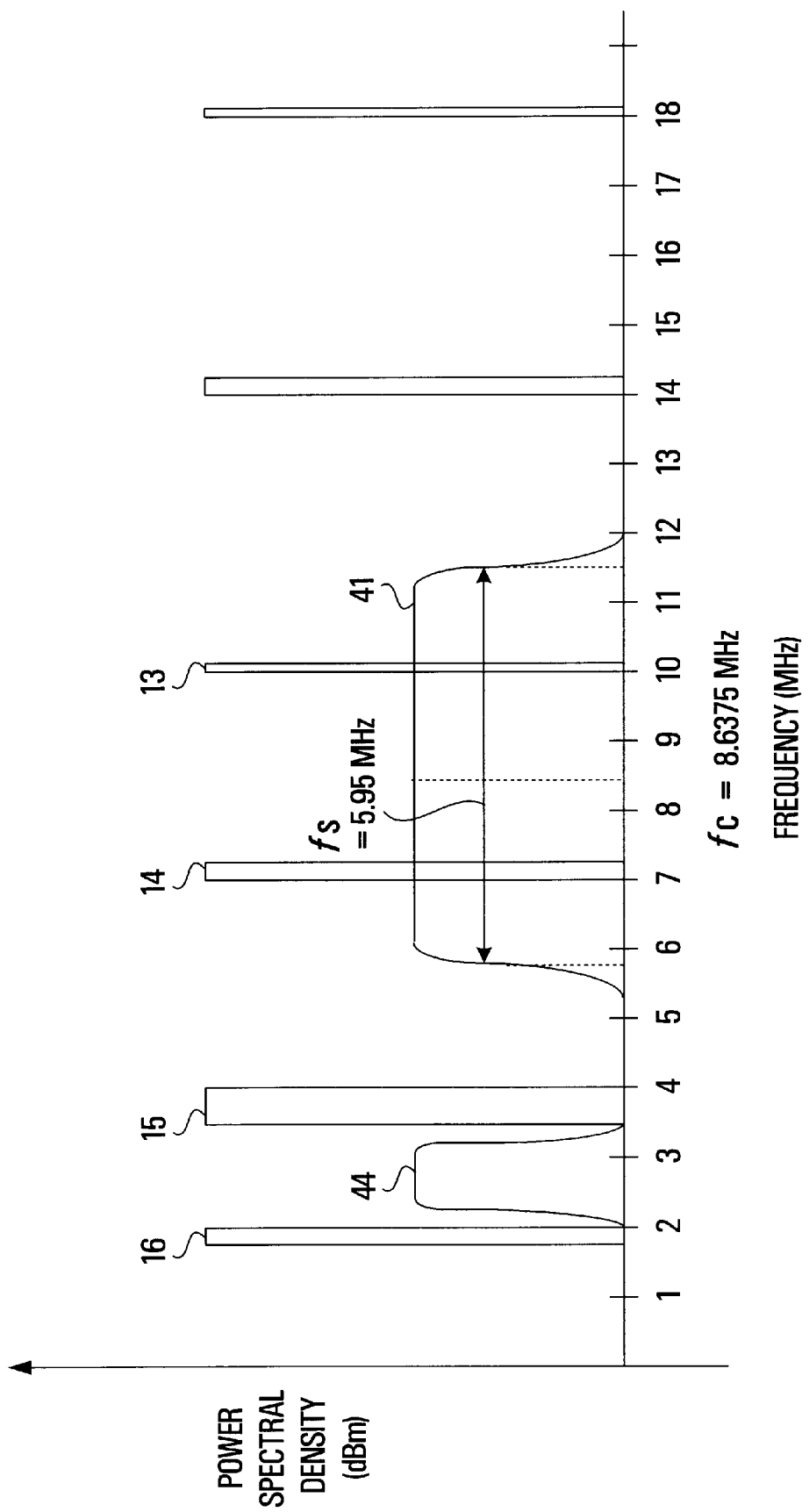
FIG. 3 shows the placement of downstream and upstream signal spectra relative to HAM bands in accordance with a preferred embodiment of the present invention.

Specifically, FIG. 3 shows a spectral allocation scheme in accordance with the present invention, in which the spectrum of the transmitted downstream modulated signal 26 (the "downstream spectrum", 41) is placed such that the carrier frequency $f_C$ falls substantially midway between HAM bands 13 and 14, more precisely at 8.6375 MHz. This contrasts with the spectral allocation scheme of FIG. 1, in which the downstream spectrum 11 was not strategically placed with respect to the HAM bands. Another difference is that the downstream spectrum 41 has a spectral width $f_S$ substantially equal to twice the difference between the center frequencies of the interfering HAM bands, i.e., 5.95 MHz.

More generally, the present invention requires that the carrier frequency $f_C$ and symbol rate $f_S$ obey the following mathematical relationship:

$$f_C = \tfrac{1}{2}(f_{H1}+f_{H2})$$

$$f_S = 2*|f_{H2}-f_{H1}|$$

where $f_{H1}$ and $f_{H2}$ are the center frequencies of any two adjacent narrow interference bands, in this case HAM bands. From the above, it follows that $f_{H1}=f_C-f_S/4$ and $f_{H2}=f_C \ldots f_S/4$. For advantageous operation of the present invention, it is not required that the equalities be exact; rather a 10% error margin in the above equations still provides sufficiently acceptable operation of the invention, It is emphasized that there is a strong correspondence between the symbol rate $f_S$ and center frequencies $f_{H1},f_{H2}$ of the interfering HAM bands. In fact, for each pair of HAM bands, there is a preferred symbol rate $f_S$ as calculated above, which may or may not be equal to a standardized downstream or upstream bandwidth. In the example considered in FIG. 3, a signal having the characteristics of the downstream spectrum 41 will deliver a bit rate of 4*5.95= 23.8 Mbps if each symbol contains 4 bits of information (as is the case in 16-QAM). This shows that the present invention is capable of delivering a high data rate using a single QAM carrier, i.e., with a simple modem.

FIG. 3 also shows placement of the spectrum of the transmitted modulated upstream signal 33 ("the upstream spectrum", 44) in such a way that it is nestled between the 80-meter and 160-meter HAM bands 15,16. Assuming that the upstream spectrum 44 carries data that is modulated using 16-QAM, and allowing for an excess bandwidth of 20% for practical Nyquist filters and an additional 25% guard band for frequency division duplexing (FDD) filters, the maximum delivered data rate for this particular positioning of the upstream spectrum will be on the order of 4*(3.5−2)÷(1.2×1.5)=4.0 Mbps, which is usually sufficient for upstream applications. It is to be understood that any higher upstream bandwidth demands can be met by placing the upstream spectrum 44 so that it straddles two HAM bands in the manner of downstream spectrum 41.

Moreover, the present invention does not exclude the possibility of transporting downstream or upstream traffic using multiple carriers in either or each direction. Added carriers may indeed be used to increase the capacity of a system already having downstream and/or upstream spectra whose respective carrier frequencies and symbol rates are subject to the above mathematical relationships.

Inventive placement of the downstream and/or upstream spectra allows drastic simplifications in the corresponding transmitter and receiver, which are now structurally and functionally described. Without loss of generality, it is assumed that the transmitter 25 in the telco modem 21 of FIG. 2 sends a transmitted modulated downstream signal 26 having a carrier frequency $f_C$ and a symbol rate $f_S$ obeying $f_C=(f_{H1}+f_{H2})/2$ and $f_S=2*|f_{H2}-f_{H1}|$ for a pair of adjacent narrowband interferers having respective center frequencies $f_{H1}$ and $f_{H2}$.

Figure 4:
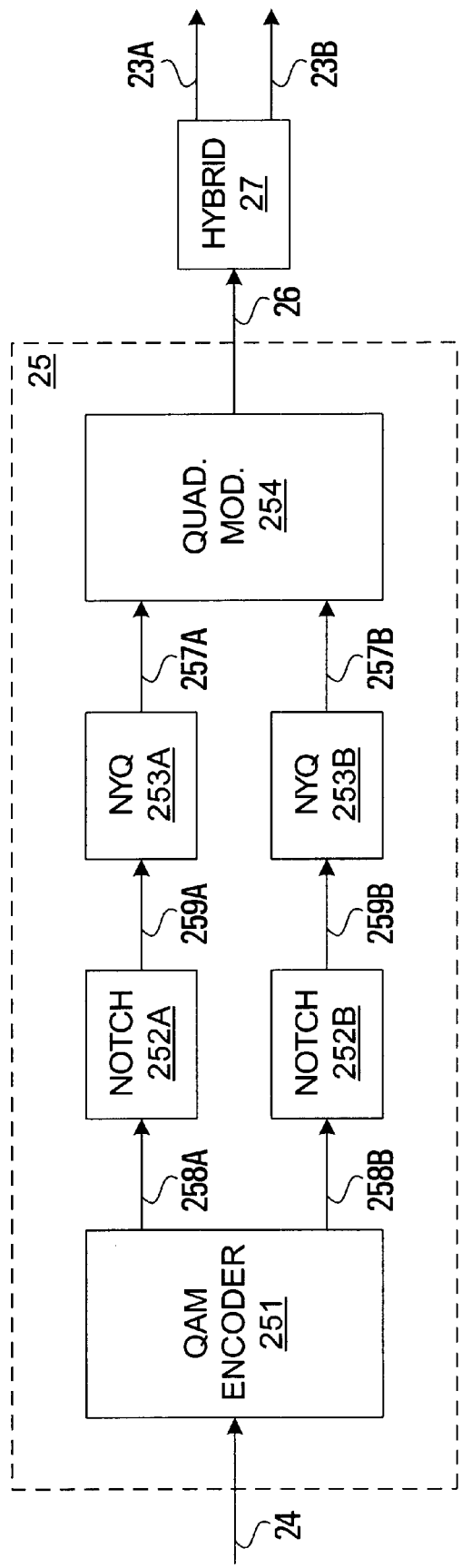
FIG. 4 is a block diagram of a transmitter in accordance with the preferred embodiment of the present invention.

With reference to FIG. 4, there is shown a transmitter 25 in accordance with the preferred embodiment of the present invention, comprising a QAM encoder 251 for accepting and encoding the downstream digital data stream 24. The QAM encoder 251 produces a pair of digital signals 258A,B which lead to a respective pair of substantially identical digital notch (or "band elimination") filters 252A,B. The filters 252A,B accept the digital signals 258A,B and produce respective filtered signals 259A,B that are fed to respective Nyquist filters 253A,B prior to entering a quadrature modulator 254. The quadrature modulator 254 then modulates the signals 257A,B onto a carrier, producing the transmitted downstream modulated signal 26, which is fed to the hybrid 27 and relayed in differential mode across the twisted pair of wires 23A,B.

In operation, the downstream digital data stream 24 enters the QAM encoder 251 at the rate of $4*f_S$ (for a 16-QAM system). The transmitter 25 is designed to have the appropriate carrier frequency $f_C$ for the QAM encoder 251 according to the above-stated mathematical relationship. The QAM encoder 251 then produces, at the symbol rate $f_S$, the two digital signals 258A,B which are known in the modulation art as the baseband "in-phase" and "in-quadrature" signals.

The digital notch filters 252A,B operate at baseband and therefore have coefficients that are complex numbers in general. The reason for this is that the conventional role of the notch filters is to provide notching around the two HAM frequencies which are, in the general case, asymmetrically placed about the carrier $f_C$ at passband, or about DC at baseband.

However, in the present invention, the desired notches are located symmetrically about the carrier frequency at baseband, or on either side of zero frequency at baseband, i.e., which makes it feasible to use real numbers for the taps of the filters 252A,B. Furthermore, since digital filters have a natural tendency to notch (or "dip") at fractional multiples of the sampling (or symbol) rate $f_S$, the desired placement of a notch at $f_S/4$ advantageously leads to simpler, i.e., shorter, notch filters 253A,B.

One aide-effect of producing a symmetrically placed notch (using real-valued coefficients for the notch filters 252A,B) is that the width of the notch on either side of zero frequency cannot be independently controlled. Since the notch at the "positive" frequency covers the HAM band centered about $f_{H2}$ and the notch at the "negative" frequency depletes the signal in the HAM band surrounding $f_{H1}$, the required notch width will be different for each notch. In order to achieve satisfactory performance, therefore, it is preferable to design the filters 252A,B so that they apply a baseband notch which is at least as wide as the wider interfering HAM band.

The path through the inventive transmitter 25 is completed by the quadrature modulator 254, which accepts the in-phase and in-quadrature outputs 257A,B of the Nyquist filters 253A,B and creates the transmitted downstream modulated signal 26 therefrom. The quadrature modulator 254 must have the appropriate carrier frequency $f_C$ which, as stated, preferably lies mid-way between the center frequencies of the two interfering HAM bands, i.e., $f_C=\frac{1}{2}(f_{H1}+f_{H2})$.

The transmitted downstream modulated signal 26 then leaves the transmitter 25, passes through the hybrid 27 and begins its journey along the twisted pair 23A,B as a differential signal. If $f_{H1}=7.15$ MHz and $f_{H2}=10.125$ MHz, then the downstream spectrum of the transmitted downstream signal 26 will be positioned as the downstream spectrum 41 in FIG. 3, although there will very little signal content at (and around) the centers of HAM bands 13 and 14.

The above discussion of the inventive transmitter 25 has emphasized the removal of signal content around two interfering HAM bands. However, amateur radio transmissions occurring in these same bands are capable of seriously corrupting the signal travelling along the twisted pair, and the received modulated downstream signal 32 may end up having a downstream spectrum characterized by intermittent periods of strong frequency content centered about (or located around) $f_{H1}$ and $f_{H2}$. This demands notch filtering at the receiver 34 in the customer premises modem 22 which, as previously discussed, generally results in increased modem complexity. However, the present invention proposes a simplified receiver for use in a system in which the transmitted (and received) signal straddles two HAM bands in the above manner having reference to FIG. 3.

Figure 5A:
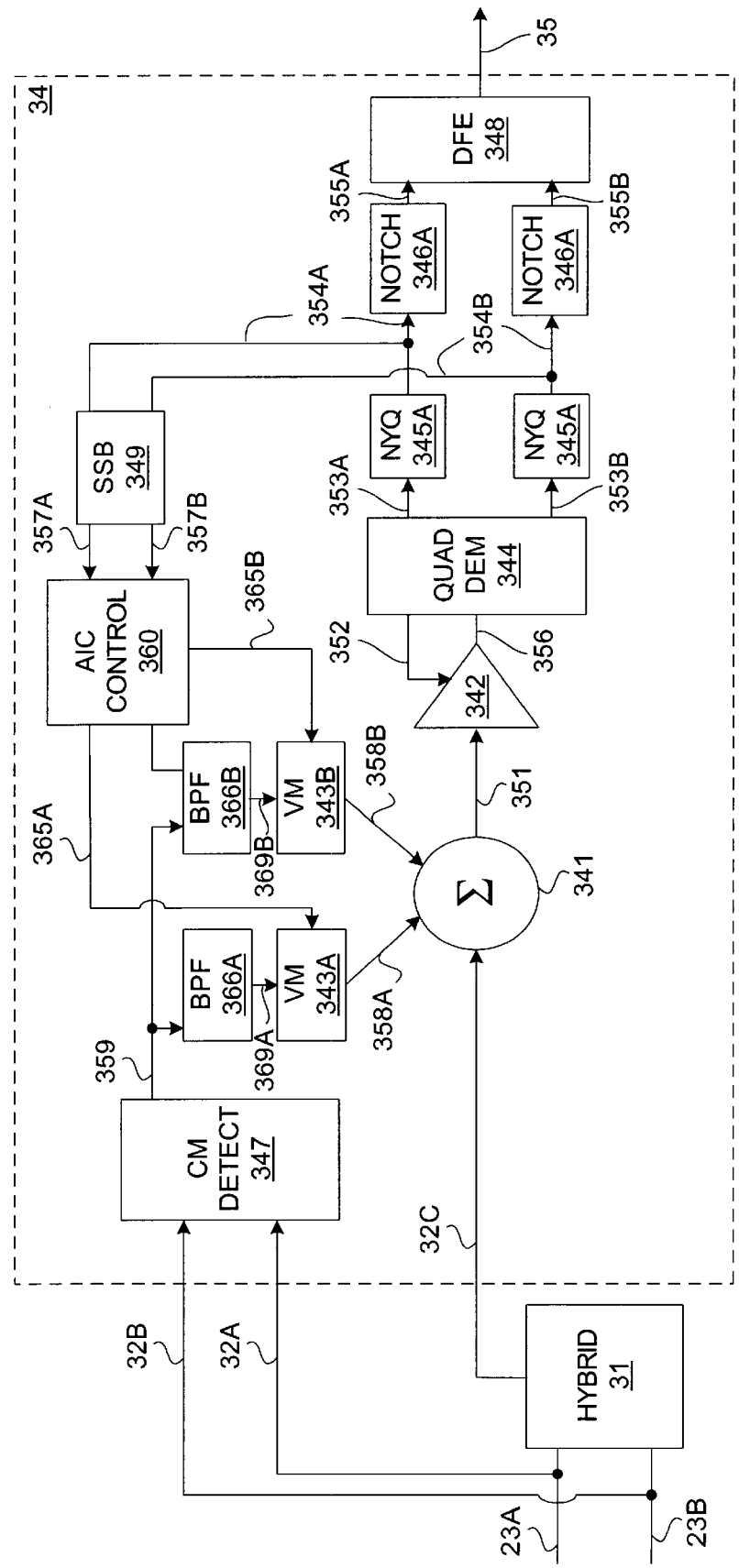
FIG. 5A is a block diagram of a receiver in accordance with the preferred embodiment of the present invention.

According to the present invention, therefore, FIG. 5A shows a receiver 34 for accepting the received modulated downstream signal in the form of a twisted-pair signal 32A,B and a differential signal 32C extracted therefrom by the hybrid 31. The differential signal 32C is fed to a summer 341, where two interference-cancellation signals 358A,B are added to the differential signal 32C to produce an interference-reduced signal 351. The interference-cancellation signals 358A,B originate from an adaptive interference control mechanism, preferably comprising a common mode detector 347, a pair of band-pass filters 366A,B, a pair of vector modulators 343A,B and an AIC control block 360. It is to be understood that the present invention may employ other suitable interference cancellation techniques.

In the preferred AIC mechanism, the common mode detector 347 extracts a common mode signal 359 from the twisted pair signal 32A,B. (Although the twisted pair signal will preferably be transmitted in differential mode, interference may manifest itself as a common mode signal affecting both wires of the twisted pair.) The common mode signal 359 is fed to two band-pass filters 196A,B, each of which has a pass band centered about a different frequency.

The band-pass filters 366A,B then feed respective signals 369A,B to respective vector modulators 343A,B, which then apply amplitude and phase changes to the signals 369A,B, thereby producing the interference cancellation signals 358A,B. The required amplitude and phase changes are fed by the AIC control block 360 via control signals 365A,B. The AIC control block derives signals 365A,B from interference estimates 357A,B provided by a single sideband (SSB) down converter 349. Each interference estimate 357A,B provides a measure of the interference remaining in one of the two interfering HAM bands.

Continuing along the main signal path in the receiver 34, the interference-reduced signal 351 enters a variable gain amplifier (VGA, 342), which is controlled by a control signal 352 to produce a level-controlled signal 356 leading to a quadrature demodulator 344. The quadrature demodulator 344 produces two demodulated signals, namely, an in-phase signal 353A and an in-quadrature signal 353B, which are fed to respective identical Nyquist filters 345A,B. the quadrature demodulator 344 contains an automatic gain control (AGC) function which controls the VGA 342 via control signal 352 that is a function of the difference between an estimate of the combined power of the demodulated signals 353A,B and a desired value.

The Nyquist filters 345A,B select the desired signal contained in the demodulated signals 353A,B, rejecting out-of-band signals and producing respective baseband demodulated signals 354A,B that enter respective identical notch filters 346A,B. The notch filters 346A,B then attempt to remove any remaining radio-frequency interference in the baseband demodulated signals 354A,B, providing respective filtered demodulated signals 355A,B to a decision-feedback equalizer (DFE, 348).

The DFE 348 is a known component, essentially comprising a linear transversal equalizer section followed by a non-linear feedback section. These sections may be implemented as respective digital filters whose parameters, usually in the form of multiplicative coefficients, are adjusted by an adaptive algorithm internal to the DFE 348. The DFE strives to eliminate any residual inter-symbol interference still present in the filtered demodulated signals 355A,B and produces both an internal control signal for adapting its taps as well as the digital data stream 35 ideally containing the exact digital data transmitted by the HDT.

Figure 5B:
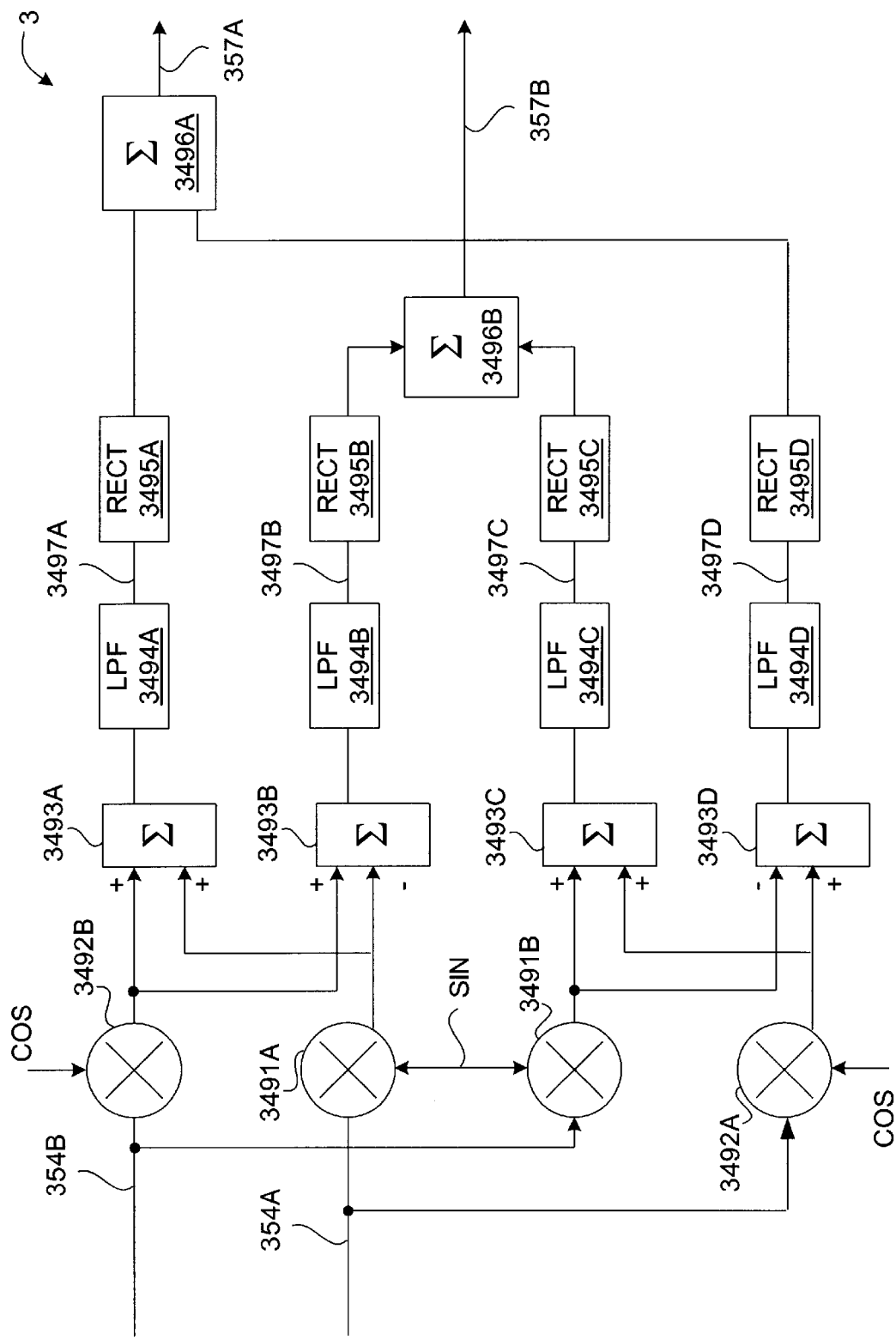
FIG. 5B is a block diagram of an SSB down converter for use in the receiver of FIG. 5A.

It is to be noted that the baseband demodulated signals 354A,B also establish a feedback control path by virtue of being connected to the SSB down converter 349. As was introduced earlier, the SSB down converter 349 respectively provides the interference estimates 357A,B to the AIC control block 360 based on the power contained in respective HAM bands $f_{H1}$, $f_{H2}$. FIG. 5B shows a suitable embodiment of the SSB down converter 349, which accepts the baseband demodulated signals 354A,B and passes each signal 354A,B through a respective sine multiplier 3491A,B and cosine multiplier 3492A,B. The sine multipliers 3491A,B are fed by a sine wave at frequency $f_S/4$ and the cosine multipliers 3492A,B are fed by a cosine wave at frequency $f_S/4$.

The output of sine multiplier 3491A is added to the output of cosine multiplier 3492B at a summer 3493A, whose output is subsequently fed to a low-pass filter 3494A. Similarly, the output of sine multiplier 3491A is subtracted from the output of cosine multiplier 3492B at a summer 3493B feeding a low-pass filter 3494B. The outputs of sine multiplier 3491B and cosine multiplier 3492A are similarly arranged at summers 3493C,D, which feed respective low-pass filters 3494C,D.

The low-pass filters 3494A,B,C,D then remove any energy from their input signals and supply residual interference signals to respective rectifiers 3495A,B,C,D. The output of rectifier 3495A is combined with the output of rectifier 3495D at a summer 3596A to produce an estimate of the power of the interference surrounding $f_{H1}$, which is fed to the AIC control block 360 as the interference estimate 357A. An estimate of the power of the interference surrounding $f_{H2}$ is similarly obtained by adding together the outputs of rectifiers 3585B and 3595C, forming the interference estimate 357B that is fed to the AIC control block 360.

Referring back to FIG. 5A, it is to be understood that analog-to-digital (A/D) conversion is to be performed at some point in the receiver 34. Preferably, such conversion will be performed by an A/D converter placed at the output of the VGA 342, although it is equally suitable to to provide a pair of converters accepting the demodulated signals 353A,B at the output of the quadrature demodulator 344 or at any other point.

It is also to be considered that while preferred placement of the notch filters 346A,B is in the baseband domain, it is also suitable to perform these operations at passband. However, the savings in terms of reduced computational complexity with respect to the prior art are not as significant as when filtering is performed at baseband, as in the preferred embodiment of FIG. 5A.

In receiver operation, the band-pass filters 366A,B filter the common mode signal 359 into separate non-overlapping signals 369A,B representing interference in the two HAM bands. Each vector modulator 343A,B independently vector modulates the corresponding signal according to a respective amplitude and phase adjustment fed via the corresponding control signal 365A,B from the AIC control block 360, thereby producing the interference-cancellation signals 358A,B which are added to the differential signal 32C by the summer 341. The AIC control block 360 executes an algorithm to determine the required amplitude and phase parameters based on the interference estimates 357A,B obtained from the SSB down converter 349.

It has been observed that with the aid of an AIC mechanism as described herein, narrowband radio-frequency interference can be reduced by up to 30 dB in each band. Naturally, other AIC techniques may also be used, which may or may not yield superior performance than the embodiment in FIG. 5A.

Continuing along the path through the receiver 34, the gain of the level-controlled signal 356 output by the VGA 342 is adjusted according to the power (or energy or magnitude) level of the demodulated signals 353A,B as demodulated by the quadrature demodulator 344. This ensures that a relatively constant signal gain is maintained. The quadrature demodulator is 344 a component known and used in the art for producing the in-phase and in-quadrature demodulated signals 353A,B from the (quadrature modulated) level-controlled signal 356.

The Nyquist filters 345A,B provide the first step in filtering the demodulated signals 353A,B, by eliminating any spectral content outside the range of interest, which is located in the baseband domain from DC to half the symbol rate. At this point, it is useful to remind the reader that in accordance with the present invention, any HAM radio interference will appear in the baseband demodulated signals 354A,B at DC plus-or-minus $f_S/4$. The notch filters 346A,B then apply a notch symmetrically disposed about DC in order to eliminate the remaining interference.

This symmetry allows implementation of the notch filters 346A,B with real-valued coefficients, as was the case in the transmitter of FIG. 4. Again, the width of the notch cannot be independently controlled and therefore it is preferable for the symmetric baseband notch applied by the notch filters 346A,B to be at least as wide as the wider of the two HAM bands centered about $f_{H1}$ and $f_{H2}$. Another feature that the notch filters 346A,B share with the notch filters 252A,B in the transmitter 25 of FIG. 4 is that the placement of a notch at $f_S/4$ is easy to achieve with a small number of taps, due to the natural tendency of the frequency response of a digital filter to exhibit notches at fractional intervals of the sampling frequency.

The DFE 348 is the final forward link in the receiver chain and makes decisions about the transmitted symbols based on the received symbols as output by notch filters 346A,B. It is important to note that while the DFE 348 is capable of eliminating much of the inter-symbol interference in a signal corrupted by a number of stable, narrow interference bands, its coefficients must reconverge when the interference changes bands dynamically. This is often the case with intermittent HAM radio transmissions, which would lead to frequent readaptation, and possibly divergence of the DFE coefficients causing signal outages. For this reason, the presence of the notch filters 346A,B is preferred, in order to eliminate frequency content in the interference bands regardless of whether or not HAM transmissions are currently taking place in those bands.

The baseband demodulated signals 354A,B also form a feedback path leading to the SSB down converter 349, which attempts to estimate the amount of interference remaining in the in-phase baseband denodulated signal 354A and in the in-quadrature baseband demodulated signal 354B. The in-phase component of the interference at a frequency $f_I$ can be represented as:

$$354A = A_X(t)\cos(2\pi(f_I - f_C)t),$$

whereas the in-quadrature component can be represented as $$354B = A_Y(t)\sin(2\pi(f_I - f_C)t),$$

where $A_X$ and $A_Y$ are the respective amplitudes of the in-phase and in-quadrature baseband demodulated signals 254A,B and t is a measure of time.

The sine and cosine multipliers 3491A,B and 3492A,B will further demodulate these signals, bringing the interference to DC when they operate at $f_S/4$. This convenient sampling rate requires the calculation of only three (real) values for the sine and cosine multiplicands, i.e., 0, 1 or −1, which has the implication that the signals 354A,B passing through the sine and cosine multipliers 3491A,B and 3492A,B are simply dropped, passed through or inverted.

The outputs of the sine and cosine multipliers have their phases adjusted by the summers 3593A,B,C,D, which, after low-pass filtering, provide the following signals at points 3597A,B,C,D:

$$3497A = \frac{1 - sgn(f_I - f_{HI})}{2} A_A(t)\sin(2\pi(f_{HI} - f_I)t)$$

$$3497B = \frac{1 + sgn(f_I - f_{H2})}{2} A_B(t)\cos(2\pi(f_I - f_{H2})t)$$

$$3497C = \frac{1 + sgn(f_I - f_{H2})}{2} A_C(t)\sin(2\pi(f_I - f_{H2})t)$$

$$3497D = \frac{1 - sgn(f_I - f_{HI})}{2} A_D(t)\cos(2\pi(f_I - f_{HI})t)$$

where sgn(x) is the signum function of x and $A_A$ through $A_D$ are respective interference amplitudes. It is clear from the above that the interference level at points 3497A and 3497D will be very close to zero when fI is very close to $f_{H1}$. Therefore, measuring the power of signals 3497A and 3497D, and summing these measurements as is done by summer 3496A, provides an estimate of the residual interference surrounding $f_{H1}$ (namely, interference estimate 357A). Similarly, the interference level at points 3497B and 3497C will be very close to zero when fI in very close to $f_{H2}$. These two signals are rectified and combined by summer 3496B, thereby providing an estimate of the residual power surrounding $f_{H2}$, namely interference estimate 357B.

From the above, it can be concluded that by carefully selecting $f_C$ and $f_S$, a high-data-rate signal whose spectrum straddles two HAM bands is made not to cause interference to HAM radio operators and at the same time is made immune to their transmissions. Furthermore, the implementational benefits include a simplified transmitter and receiver having short baseband filters with real-valued coefficients.

Figure 6:
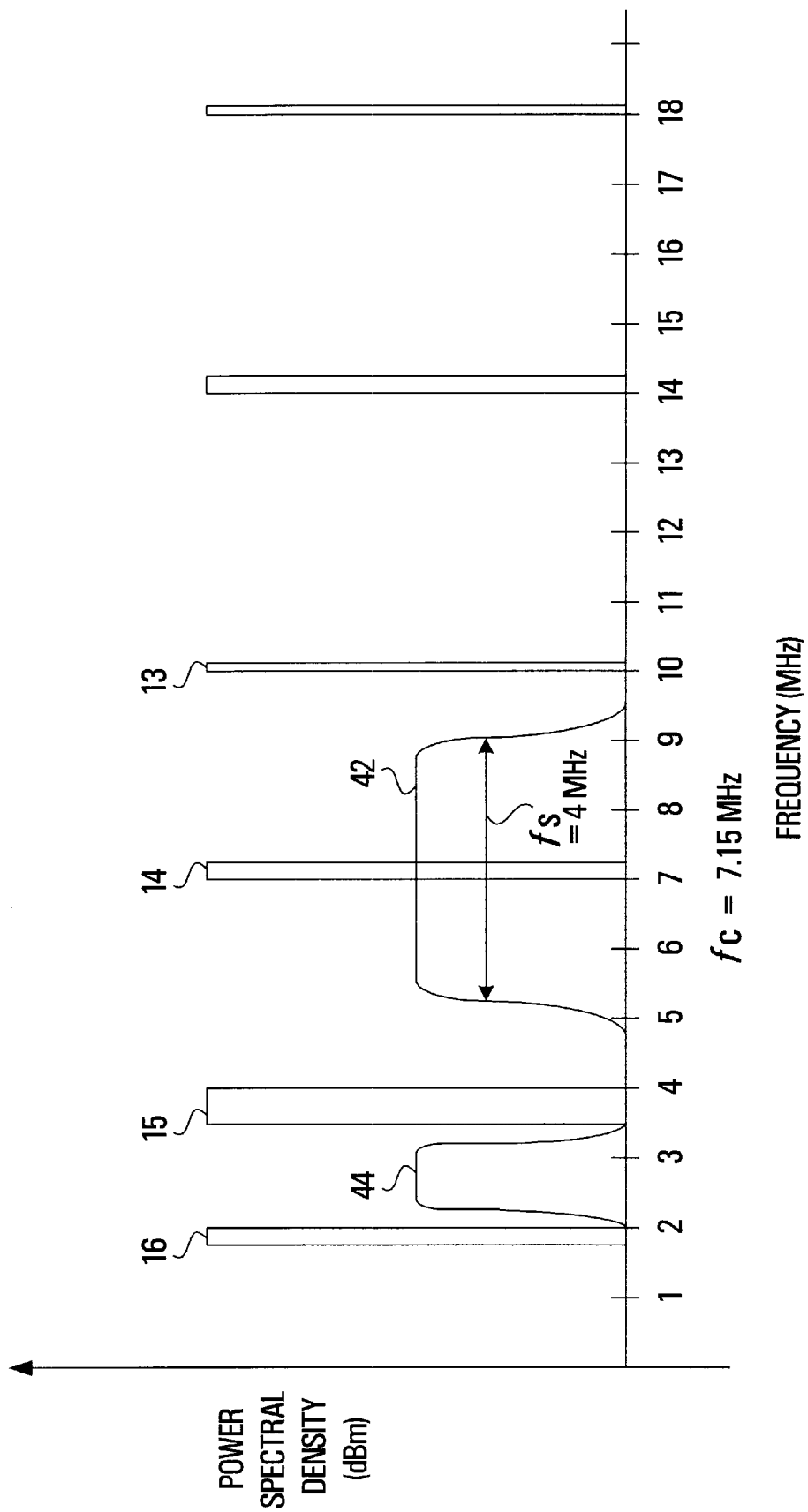
FIG. 6 shows the placement of downstream and upstream signal spectra relative to HAM bands in accordance with an alternate embodiment of the present invention.

In some applications, the bandwidth of the signal intended to be transmitted may be on the order of 5 MHz or less, in which case it is possible to align the signal spectrum so that only one amateur band is straddled, leading to even more radical simplifications in the transmitter and receiver An inventive frequency allocation scheme in accordance with such an alternate embodiment of the present invention is shown in FIG. 6.

In the example of FIG. 6, the downstream spectrum 42 now has a carrier frequency $f_C$ equal to (or within about 10% of) the center frequency of HAM band 14, in this case 7.15 MHz, and occupies a spectral region between 4 MHz and 10 MHz supporting a symbol rate $f_S$ of 6÷1.5=4.0 MHz (after accounting for guard bands). It is noted that $f_S$ is not constrained to a single value, but rather can take on any value less than the above calculated value in the case of HAM band 14.

In a 16-QAM system, a 6 MHz downstream bandwidth enables the delivery of 4*(6÷1.5)=16 Mbps, which is adequate in many instances, illustrating that the alternate embodiment of the present invention is just as useful than the preferred embodiment, if not more so. It is to be understood, of course, that this alternate spectral positioning technique may also be applied to the upstream spectrum 44, although in this example, it continues to lie between HAM bands 15 and 16.

Figure 7:
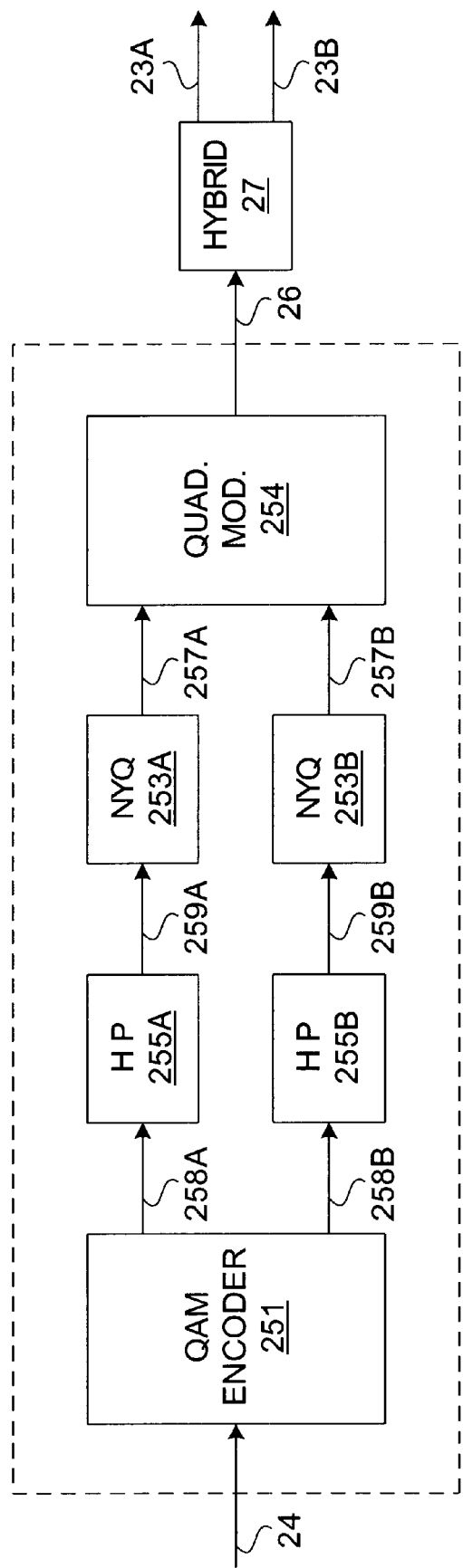
FIG. 7 is a block diagram of a transmitter in accordance with an alternate embodiment of the present invention.

FIG. 7 shows the corresponding simplifications to the transmitter 25, which now comprises two real-coefficient baseband high-pass filters 255A,B (instead of the two real-coefficient baseband notch filters of FIG. 4). The high-pass filters 255A,B simply attenuate frequencies around DC (at baseband), which translates into removing frequency content around the carrier frequency once the signals 259A,B are Nyquist filtered by respective Nyquist filters 253A,B and quadrature modulated by the quadrature modulator 254. Trading a band-pass filter for a high-pass filter usually results in halving the computational complexity, as only half the coefficients are generally required to achieve the same spectral sharpness.

Aside from straightforward filtering, another way to produce a notch around the carrier frequency is for the QAM encoder 251 to provide digital signals 258A,B that have been encoded using a partial response filter with a null at DC, for instance, a class 4 partial response filter. Subsequent to modulation by the quadrature modulator 254, the transmitted downstream modulated signal 26 will contain a "natural" notch at the carrier frequency.

The simplifications to the receiver are most evident when described with reference to FIG. 8, in which is shown a receiver 34 for use with a system having a downstream spectrum centered about a HAM band. The receiver 34 now comprises only one vector modulator 343 which deals with only one interferer, and therefore is capable of accepting the (unfiltered) common mode signal 359 from the common mode detector 347. The AIC control block 360 now provides only one control signal 365, which is calculated by an algorithm that relies on a single interference estimate 357 from a simple power estimator 350.

The VGA 342, quadrature demodulator 344 and Nyquist filters 345A,B remain identical to the components in FIG. 5A. However, the band-pass filters 346A,B of FIG. 5A have been replaced by optional high-pass filters 340A,B, owing to the fact that the baseband demodulated signals 354A,B will require a notch at DC to eliminate the interference due to a single HAM band. The high-pass filters 340A,B are symmetrical, have real coefficients, and are also optional, since the DFE 348 is capable of compensating for the filtered demodulated signals 355A,B having been corrupted by a single source of narrowband interference, as previously discussed.

Figure 8:
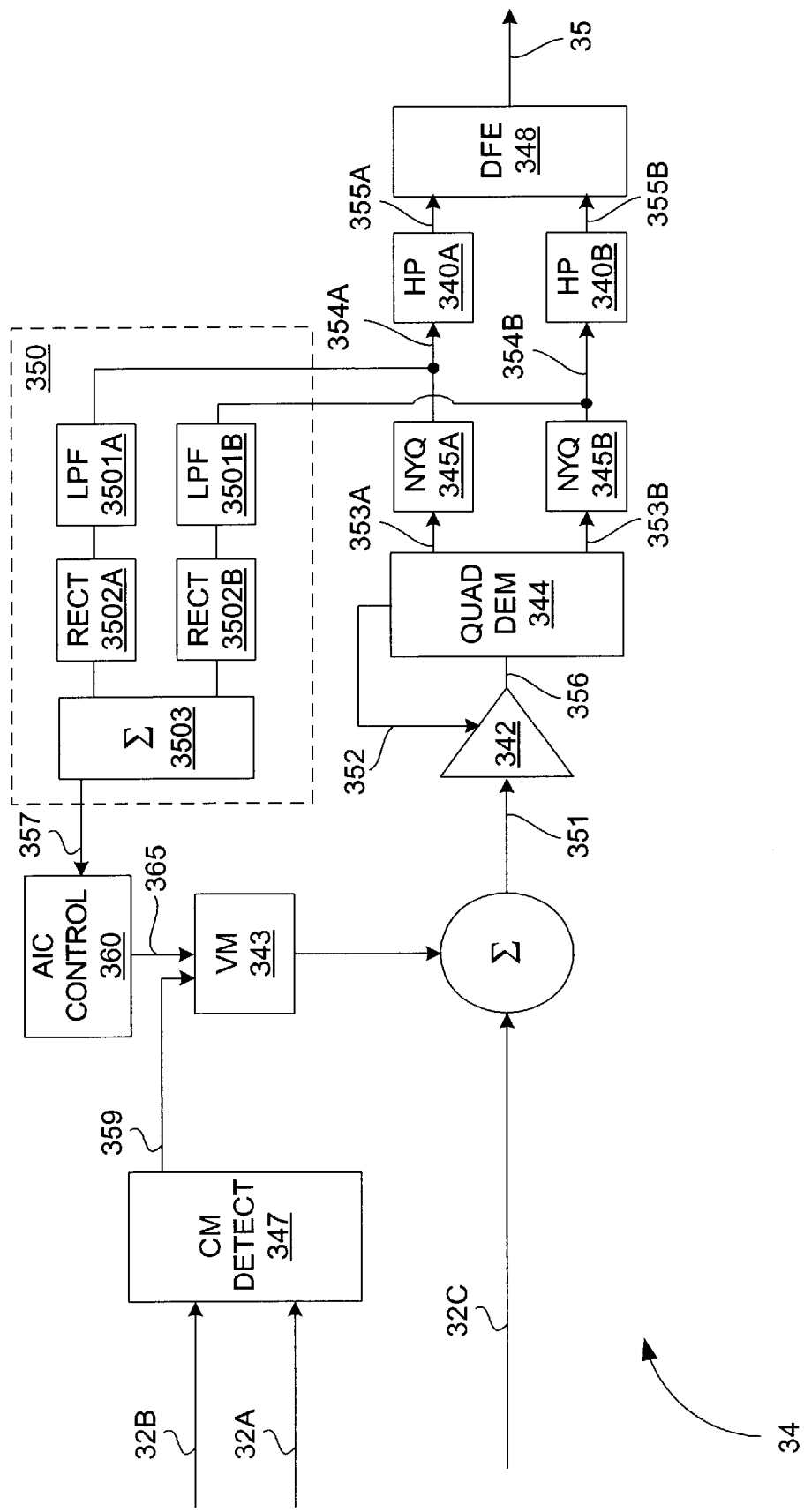
FIG. 8 is a block diagram of a receiver in accordance with an alternate embodiment of the present invention.

Moreover, the SSB down converter of FIGS. 5A and 5B has been replaced in the receiver 34 of FIG. 8 by a very simple power estimator 350 for removing any data present in the baseband demodulated signals 354A,B by first passing them through respective low-pass filters 3501A,B. (Since the residual interference occurs from a single source at DC in the baseband domain, a second demodulation phase is not required, and no separation of the interferers is required.) The power of the in-phase interference is measured by a rectifier 3502A connected to the output of low-pass filter 3501A. Similarly, the in-quadrature interference power is measured by a rectifier 3502B connected to the output of the low-pass filter 3501B. The output of each rectifier 3502A,B is then supplied to a summer 3503, which forms the interference estimate 357 fed to the AIC control block 360.

Upon closer inspection of the receiver in FIG. 8, it is noted that the AIC control block 360 requires only one interference estimate 357 (as opposed to the AIC block of FIG. 5A, which needed two such estimates). Since only a single power (or energy or magnitude) estimate is required, it may in fact be taken from any component which already generates a similar error signal. Such a signal is generated by the quadrature demodulator 344, for example, which provides the VGA 342 with a control signal 352 that will be larger when there is more interference and smaller when there is less interference Also, the DFE 348 internally generates a suitable control signal that may be tapped and brought to the AIC control block.

Figure 9:
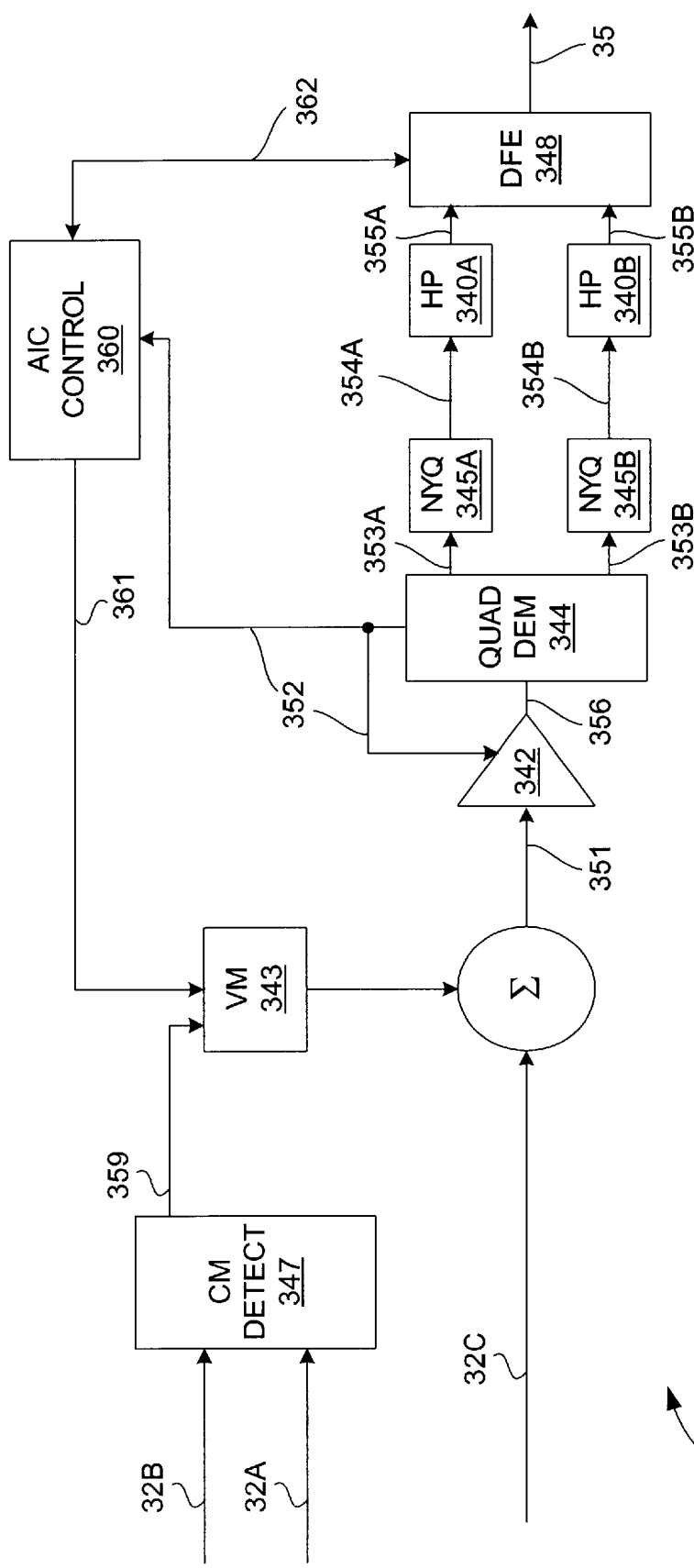
FIG. 9 is a block diagram of a receiver in accordance with yet another alternate embodiment of the present invention.

These two control signals may both be used as an error signal by the AIC control block, as is illustrated in FIG. 9. In this alternate embodiment of the present invention, it is proposed to supply the AGC control signal 352 from the quadrature demodulator 344 and a DFE control signal 362 from the DFE 348 to the AIC control block 360. The AIC control block 360 is assumed capable of switching between relying on the control signal 352 or on the control signal 362. It is also assumed that the control signal 362 enables the AIC control block 362 to control adaptation of the DFE coefficients.

In operation, there are two scenarios to consider, namely, either the interfering HAM band is in use or it is not When indeed hit by interference, the AIC control block 360 begins by freezing the DFE taps (via control signal 362), and calculates the appropriate magnitude and phase shift to be applied by the vector modulator 343, based on the control signal 352 from the quadrature modulator 344. Meanwhile, the DFE 4348 attempts to eliminate inter-symbol interference and will be unstable until the AIC mechanism has somewhat reduced the interference in the differential signal 32C.

After a stable operating point has been reached, that is to say, after acquisition of the DFE 348, the AIC control block 360 switches to the DFE control signal 362 as a more sensitive estimate of the remaining interference, which allows the AIC mechanism to refine its suppression of HAM radio interference. The AIC control block 360 will then converge sufficiently to reduce the strength of the interference to less than the strength of the signal by a certain amount of decibels. The AIC mechanism can provide up to 30 dB of interference suppression over an interference band of up to approximately 10% of the carrier frequency.

The control algorithm 360 will subsequently un-freeze the DFE coefficients via control signal 362, permitting them to adaptively adjust in the normal way, using, e.g, a least-mean-square algorithm. The DFE 348 will then create a notch with its forward taps and strive to eliminate inter-symbol interference with its feedback taps. When there are 16 forward taps and 16 feedback taps, it has been simulated and confirmed through experiment that additional interference suppression of 30 dB can be achieved by the DFE, for a total of 60 dB when combined with the effect of the AIC block 343.

If, on the other hand, the HAM band is not in use, interference suppression by the AIC block 343 is neither desired nor achieved. In this case, the AIC control block 360 will detect an extremely low level of interference. The control algorithm 360 will simply instruct the DFE 348 via control signal 362 to un-freeze the DFE coefficients, allowing them to adapt in the usual way. In this scenario, it might also be desirable to cease adaptation of the AIC block altogether.

It is to be noted that when the high-pass filters 340A,B are omitted from the receiver 34 in FIG. 9, the only filtering stage in the receiver is formed by the adaptable DFE coefficients. In cases where HAM interference is intermittent, it is expected that frequent readaptation of these coefficients will be required each time there is a change in the amateur radio transmission characteristics.

Interestingly, however, it has been observed that there is a tendency for the DFE taps to remain constant, even after HAM band interference has disappeared. That is to say, adaptation for the HAM interference appears to reach a stable local optimum. Nevertheless, since long term stability of the real part of the DFE taps is not fully known, it is considered preferable to freeze the real part of the DFE coefficients once a satisfactory operating condition is reached so as to avert excessive readaptation periods with a higher degree of certainty, while allowing the imaginary part of the coefficients to adapt to changes in cable characteristics, such as temperature.

While the preferred embodiment and several alternate embodiments of the present invention have been described and illustrated, it is to be understood that variations in the design may be made. For example, the modulation format used in the inventive transmitter and receiver may be a different from the 16-QAM modulation scheme described herein. Other suitable modulation types include different levels of QAM or different modulation formation altogether, such as CAP, BPSK or differential schemes based on any of these formats.

Moreover, as a general comment having regard to the inventive spectral allocation schemes depicted in FIGS. 3 and 6, it should be appreciated that the invention applies to the transmission and reception of signals in both directions of traffic flow, i.e., upstream and downstream. Furthermore, use of the methods disclosed herein does not preclude the parallel use of other transmission techniques to enhance bandwidth capacity.

For example, it is feasible to transmit a first portion of a downstream spectrum straddling two HAM bands in accordance with the preferred embodiment of FIG. 3 and to transmit a second portion of the downstream spectrum located between two other HAM bands. At the same time, the upstream spectrum may also be divided into two portions, one of which may rest between two HAM bands and the other of which may straddle one HAM band in accordance with the alternate embodiment of FIG. 6.

In view of the above description and illustrations, therefore, the scope of the invention is only to be limited by the claims appended hereto.

We claim:

1. A transmitter for transmitting a modulated signal across a transmission medium, the transmitter comprising:

an encoder for encoding a digital data stream into one or more encoded digital signals;

one or more substantially identical baseband notching filters connected to the encoder, for respectively receiving the one or more encoded digital signals, each baseband notching filter having a notch at zero frequency; and a modulator connected to the one or more baseband notching filters, for producing the modulated signal centered about a carrier frequency, wherein the carrier frequency is approximately equal to the center frequency of an interference band.

2. A transmitter according to claim 1, further comprising one or more substantially identical Nyquist filters respectively connected between the one or more notching filters and the modulator.

3. A transmitter according to claim 1, wherein the baseband notching filters have real-valued coefficients.

4. A transmitter according to claim 1, wherein the encoder is a quadrature amplitude modulation (QAM) encoder producing two encoded signals, of which one is an in-phase encoded signal and the other is an in-quadrature encoded signal, and wherein the modulator is a quadrature modulator.

5. A transmitter according to claim 1, wherein the interference band is an amateur radio band having a center frequency approximately equal to one of 1.9, 3.75, 7.15, 10.125, 14.175, 18.118 and 21.225 Megahertz.

6. A transmitter according to claim 1, wherein the interference band has a bandwidth of less than or approximately equal to 10% of the carrier frequency.

7. A transmitter for transmitting a modulated signal across a transmission medium, the transmitter comprising:

an encoder for encoding a digital data stream into one or more encoded digital signals having a symbol rate $f_S$;

one or more substantially identical baseband notching filters connected to the encoder, for respectively receiving the one or more encoded digital signals, each baseband notching filter having a pair of notches symmetrically disposed about zero frequency at frequencies approximately equal to $\pm f_S/4$; and a modulator connected to the one or more baseband notching filters, for producing the modulated signal centered about a carrier frequency $f_C$;

wherein $f_S$ and $f_C$ are related to the center frequencies $f_{H1}$ and $f_{H2}$ of two interference bands by $f_C$ being approximately equal to $\frac{1}{2}(f_{H1}+f_{H2})$ and $f_S$ being approximately equal to $2|f_{H2}-f_{H1}|$.

8. A transmitter according to claim 7, further comprising one or more substantially identical Nyquist filters respectively connected between the one or more notching filters and the modulator.

9. A transmitter according to claim 7, wherein the baseband notching filters have real-valued coefficients.

10. A transmitter according to claim 7, wherein the encoder is a quadrature amplitude modulation (QAM) encoder producing two encoded signals, of which one is an in-phase encoded signal and the other is an in-quadrature encoded signal, and wherein the modulator is a quadrature modulator.

11. A transmitter according to claim 7, wherein the interference bands are adjacent amateur radio bands, having corresponding center frequencies $f_{H1}$ and $f_{H2}$ chosen from the set of 1.9, 3.75, 7.15, 10.125, 14.175, 18.118 and 21.225 Megahertz, approximately.

12. A transmitter according to claim 7, wherein the interference bands have bandwidths of less than or approximately equal to $0.1 \times f_C$.

13. A method of transmitting digital data, comprising the steps of:

encoding the data into one or more baseband digital signals;

filtering the one or more baseband digital signals with respective baseband filters having notches at zero frequency;

modulating the filtered baseband digital signals about a carrier frequency, thereby to produce a modulated signal; and transmitting the modulated signal across a transmission medium;

wherein the carrier frequency is approximately equal to the center frequency of an interference band.

14. A method according to claim 13, wherein the center frequency of the interference band is approximately equal to one of 1.9, 3.75, 7.15, 10.125, 14.175, 18.118 and 21.225 Megahertz.

15. A method according to claim 13, wherein the encoding step further comprises further encoding the data in accordance with a partial response filter having a null at zero frequency.

16. A method of transmitting digital data, comprising the steps of:

encoding the data into one or more baseband digital signals;

filtering the one or more baseband digital signals with respective baseband filters having notches at frequencies approximately equal to $\pm \Delta f$;

modulating the filtered baseband digital signals about a carrier frequency $f_C$, thereby to produce a modulated signal; and transmitting the modulated signal across a transmission medium;

wherein $f_C+\Delta f$ is approximately equal to the center frequency of a first interference band and $f_C-\Delta f$ is approximately equal to the center frequency of a second interference band.

17. A method according to claim 16, the baseband digital signals having a common symbol rate, wherein $\Delta f$ is approximately equal to one-quarter the symbol rate.

18. A method according to claim 16, wherein the first and second interference bands are adjacent, and wherein the center frequencies of the first and second interference bands are chosen from the set of 1.9, 3.75, 7.15, 10.125, 14.175, 18.118 and 21,225 Megahertz, approximately.

* * * * *